(12) United States Patent
Koren

(10) Patent No.: US 7,276,721 B2
(45) Date of Patent: Oct. 2, 2007

(54) METHOD AND APPARATUS FOR IMPROVED CONTRAST RESOLUTION

(75) Inventor: Jacob Koren, Carmelia (IL)

(73) Assignee: Carestream Health, Inc., Rochester, NY (US)

( * ) Notice: Subject to any disclaimer, the term of this patent is extended or adjusted under 35 U.S.C. 154(b) by 266 days.

(21) Appl. No.: 11/200,987

(22) Filed: Aug. 10, 2005

(65) Prior Publication Data

US 2006/0033059 A1 Feb. 16, 2006

Related U.S. Application Data

(60) Provisional application No. 60/601,080, filed on Aug. 12, 2004.

(51) Int. Cl.
*G01T 1/105* (2006.01)

(52) U.S. Cl. .................................. 250/584

(58) Field of Classification Search ................ 250/584
See application file for complete search history.

(56) References Cited

U.S. PATENT DOCUMENTS

| | | |
|---|---|---|
| 3,752,905 A | 8/1973 | Schneider |
| 4,387,428 A | 6/1983 | Ishida et al. |
| 5,278,754 A | 1/1994 | Arakawa |
| 5,357,118 A | 10/1994 | Fukuoka et al. |
| 5,535,289 A | 7/1996 | Ito |
| 6,624,438 B2 | 9/2003 | Koren |
| 7,091,512 B2 * | 8/2006 | Arakawa ................... 250/586 |

FOREIGN PATENT DOCUMENTS

| | | |
|---|---|---|
| EP | 0 398 029 | 11/1990 |
| EP | 0 414 159 | 2/1991 |

* cited by examiner

*Primary Examiner*—David Porta
*Assistant Examiner*—Christopher G Webb

(57) ABSTRACT

A radiation image read-out method and apparatus for a stimulable phosphor sheet, provided with a layer of stimulable phosphor, which has been exposed to radiation to carry information about an image, and the image is thereby stored on the stimulable phosphor sheet. The method includes the steps of: exposing the stimulable phosphor sheet to stimulating rays to emit light in proportion to the amount of energy stored thereon during its exposure to radiation; sensing the emitted light to generate a detection signal; amplifying the detection signal using a first amplifier or a second amplifier, dependent on the magnitude of the detection signal, to generate an amplified detection signal, the first amplifier differing from the second amplifier; and converting the amplified detection signals into a digital signal to form a digital image. In a preferred embodiment, the first and second amplifiers are logarithmic and linear amplifiers.

14 Claims, 8 Drawing Sheets

METHOD AND APPARATUS FOR IMPROVED CONTRAST RESOLUTION

CROSS REFERENCE TO RELATED APPLICATIONS

Reference is made to, and priority is claimed from, Provisional Patent Application No. 60/601,080, entitled "METHODS AND APPARATUS FOR IMPROVED CONTRAST RESOLUTION", and filed on Aug. 12, 2004, in the names of Koren, and which is assigned to the assignee of this application.

FIELD OF THE INVENTION

The invention relates generally to the field of radiography and in particular to an image reading apparatus and method which reads images stored in a photostimulated phosphor.

BACKGROUND OF THE INVENTION

X-ray imaging technology provides a non-invasive technique for visualizing the internal structure of an object of interest by exposing the object to high energy electromagnetic radiation (i.e., X-rays). X-rays emitted from a radiation source pass through the object and are absorbed at varying levels by the internal structures of the object. As a result, X-ray radiation exiting the object is attenuated according to the various absorption characteristics of the materials which the X-rays encounter.

The absorption characteristics of the object of interest may be captured by placing the object between a high energy electromagnetic radiation source and an image recording medium. As radiation from the source passes through the object, the radiation impinges on the image recording medium with an intensity related to the radiation attenuation caused by the different absorption characteristics of the object. The impinging radiation causes a change in the image recording medium that is proportional to the radiation intensity, thereby storing information about the internal structure of the object. The image recording medium may then be processed to recover the stored information by, for instance, converting it into digital form. Common types of image recording media include sheet film, phosphor media, and the like.

Phosphor plate technology has emerged as a valuable image recording media for computed radiography (CR). When electromagnetic radiation, such as X-ray radiation, impinges on a phosphor plate, the radiation interacts with the phosphor lattice of the plate. The phosphors in the plate store energy proportional to the intensity of the impinging radiation. This energy can later be released by scanning the plate with a laser to excite the phosphors in the plate (i.e., by causing the phosphors to fluoresce). The excited phosphors release radiation that can be detected, quantified and stored as values representing pixels in an image.

As discussed above, radiation penetrating an object being imaged is attenuated according to the various absorption characteristics of the object, e.g., Z-number, density, and the like. In addition, radiation penetrating an object will also undergo a characteristic attenuation due to the thickness of the attenuating material. The thickness of a material refers to a dimension of the material generally in the direction penetrating radiation is propagating. However, this characteristic attenuation is not a linear function of material thickness. Rather, as the thickness of the material increases, the intensity of penetrating rays of radiation will decay exponentially.

FIG. 1 illustrates the exponential relationship between the thickness of intervening material and the attenuation of the penetrating radiation. Object 100 is composed of a material having a uniform density p and a linearly increasing thickness along the z-axis. For example, object 100 may be a piece of aluminum having a ramp shape in the z-direction. Object 100 is illustrated as comprising five layers, each layer adding an incremental thickness $z_0$. Object 100 is exposed to radiation 105 which penetrates object 100 in a direction substantially parallel to the z-axis, as illustrated by exemplary rays 105a-105f. The thickness of the arrows schematically denotes the relative intensity of the radiation of the respective ray.

As shown, exemplary rays 105a-105f enter object 100 at substantially the same intensity (e.g., at the intensity of radiation provided by the radiation source). After the radiation penetrates object 100, it impinges upon phosphor plate 120, which absorbs the radiation and stores energy proportional to the intensity of the impinging rays. As shown by exemplary rays 115a-115f, the increasing thickness of object 100 will attenuate the radiation by increasing amounts. For example, ray 115a undergoes relatively small attenuation as the thickness of object 100 near y=0 is essentially negligible, while ray 115b experiences a relatively large attenuation due to the increased material thickness. As discussed above, this characteristic attenuation does not increase linearly with thickness, but rather the intensity of radiation 105 decreases exponentially with thickness. That is, the change in intensity of radiation 105 between each incremental thickness $z_0$ will start out relatively large (e.g., the large change in intensity between layer 100a and 100b) and will become relatively small to negligible (e.g., the small change in intensity between layers 100d and 100e) as a function of increasing thickness.

The attenuation of radiation through a solid material can be described generally according to the characteristic attenuation function:

$$I = I_0 e^{-\mu(z)} \tag{1}$$

where I is the intensity of rays having penetrated the material through a thickness z, $I_0$ is the intensity of the radiation emitted from the radiation source before penetrating the material, and $\mu$ is the linear absorption coefficient for the material. The linear absorption coefficient $\mu$ incorporates various absorption and scattering effects including Thompson scattering, Compton scattering, photoelectric (PE) absorption, pair production, photodisintegration, and the like, and is different for different materials. At radiation power levels typical of diagnostic imaging, the PE absorption is a main contributor to radiation attenuation, and depends, in part, on the density of the material through which the radiation penetrates.

FIG. 2 illustrates a plot 200 including a curve 210 showing the ratio of emitted radiation intensity ($I_0$) to penetrating radiation intensity (I) as a function of thickness z, caused by material having a linear absorption coefficient $\mu$, for example, object 100 in FIG. 1. The ratio ranges from a value of 1 at a thickness of zero (i.e., zero attenuation) and asymptotically approaches zero as a function of increasing thickness (i.e., approaches infinite attenuation).

As a result of the characteristic exponential attenuation, radiation impinging on the phosphor plate will have an exponential bias to material thickness. For relatively small thicknesses, the contrast resolution will be relatively high, while for relatively large thicknesses, the contrast resolution will be relatively small. Stated differently, the change in radiation attenuation will be much more significant for first increments of additional material thickness than for later increments. For example, radiation penetrating object 100 will undergo a greater range of ray attenuation while penetrating layer 100*a* than it will penetrating 100*b*. When the radiation penetrates to layer 100*f*, changes in radiation per incremental thicknesses approaches negligible.

Accordingly, radiation impinging on the phosphor plate will have an exponential distortion as a function of material thickness. When the energy stored in the phosphor plate (i.e., the latent image) is released, the intensity of the released energy may not appropriately reflect the density of the subject matter through which it penetrated, and in turn, the resulting digital image may not be an accurate depiction of the internal structure of the object being imaged, since the contrast resolution will vary across the dynamic range.

Many conventional processing techniques have attempted to compensate for this phenomenon by inverting the effects of the exponential attenuation. For example, rearranging equation (1) and taking the natural logarithm of both sides results in the expression:

$$ln(I/I_0) = -\mu(z) \qquad (2)$$

which results in a more intuitive linear relationship between attenuation and material thickness z. Accordingly, conventional systems have applied a logarithmic amplifier to detection signals generated during scanning of a phosphor plate to compensate for the characteristic exponential attenuation. The amplified detection signals will appear as if each incremental thickness in material causes the same amount of attenuation on the penetrating radiation, regardless of whether the increment is the first portion of a material or the last portion of the material. That is, logarithmic amplification adjusts values of a detection signal substantially to correspond to a constant change in radiation intensity as a function of material thickness.

FIG. 3 schematically illustrates a scanning process 300 of a conventional computer radiography imaging process. Radiation 305 (e.g., X-ray radiation) is emitted from a radiation source to expose an object being imaged. Radiation 305 may be emitted over some desired area, for example, a region of a patient undergoing a diagnostic procedure. Accordingly, radiation 305 will have an intensity distribution $I_0(x,y)$ in the x-y plane and will propagate generally in the z-direction to penetrate the object. As discussed above, the radiation penetrating the object will undergo attenuation that can be generally modeled by the expression in equation (1) as shown in attenuation block 310. Radiation 305' exiting the object will have an intensity distribution $I(x,y)$ that depends on the absorption characteristics of the object being imaged, and will carry some distortion due to the exponential attenuation characteristic. Radiation 305' may then impinge on an image recording medium, such as a phosphor plate 320, thus storing the intensity distribution $I(x,y)$ as a latent image in the phosphors of the plate.

The energy stored in phosphor plate 320 may then be released by scanning the phosphor plate with stimulating radiation, for example, a laser beam. The laser beam causes the phosphors in the plate to fluoresce and release stimulated radiation in proportion to the amount of energy stored in the phosphors. Scanning apparatus adapted to release a latent image from an image recording medium are known in the art, for example, the scanning apparatus described in U.S. Pat. No. 6,624,438 (Koren), which is herein incorporated by reference in its entirety. An exposed phosphor plate may be scanned, by means known to those skilled in the art, by providing the laser beam such that it impinges on the phosphor plate in a regular path, traversing the surface of the phosphor plate to release energy stored at various locations along the path in a substantially serial manner.

The phosphor plate then releases energy region by region as the laser traverses in time along the scan path. The energy from each region may ultimately correspond to a pixel in the resulting image. Accordingly, the energy released by the phosphor plate includes radiation having an intensity distribution as a function of time. For example, phosphor plate 320 may release energy by emitting stimulated radiation 315 having an intensity distribution I'(t). Since the scan path is generally planned, the timing of the released energy encodes the location from which the energy was released.

Radiation 315 may be sensed by a detector responsive to stimulated radiation to generate a detection signal indicative of the intensity of the radiation. For example, a photomultiplier tube (e.g., PMT 350 in FIG. 3) may be arranged proximate the phosphor plate such that at least some of radiation 315 emitted from the phosphor plate impinges on the photosensitive surface of PMT 350. In response, PMT 350 generates an electrical signal having a magnitude indicative of the intensity of the impinging radiation. In FIG. 3, PMT 350 generates an electrical signal 325 that varies in magnitude according to the intensity distribution of radiation 315 (e.g., according to I'(t)).

However, the distortion caused by the characteristic exponential attenuation of the object being imaged is propagated through the process and may therefore be carried by electrical signal 325. That is, electrical signal 325 may be a distorted description of the density characteristics of the object being imaged. To compensate, conventional systems have provided electrical signal 325 to logarithmic amplifier 360 to essentially invert the effects of the characteristic exponential attenuation. Logarithmically amplified signal 325' may then be provided to an analog-to-digital converter (ADC) 370 to convert the electrical signal into a digital signal 335 to form a digital image 390. The resulting image may then be transmitted, further processed and/or displayed such that the internal structures of the object may be viewed.

Issues associated with image read-out are described in U.S. Pat. No. 5,357,118 (Fukuoka), U.S. Pat. No. 5,278,754 (Arakawa), and U.S. Pat. No. 5,535,289 (Ito), all incorporated herein by reference.

SUMMARY OF THE INVENTION

An object of the present invention is to provide a radiation read-out method and apparatus having improved contrast resolution.

Any objects provided are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a radiation image read-out method for a stimulable phosphor sheet, provided with a layer of stimulable phosphor, which has been exposed to radiation to carry information about an image, and the image is thereby stored on the stimulable phosphor sheet. The method includes the steps of: exposing the stimulable phosphor sheet to stimulating rays to emit light in proportion to the amount of energy stored thereon during its exposure to radiation; sensing the emitted light to generate a detection signal;

amplifying the detection signal using a first amplifier or a second amplifier, dependent on the magnitude of the detection signal, to generate an amplified detection signal, the first amplifier differing from the second amplifier; and converting the amplified detection signals into a digital signal to form a digital image. In a preferred embodiment, the first and second amplifiers are logarithmic and linear amplifiers.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
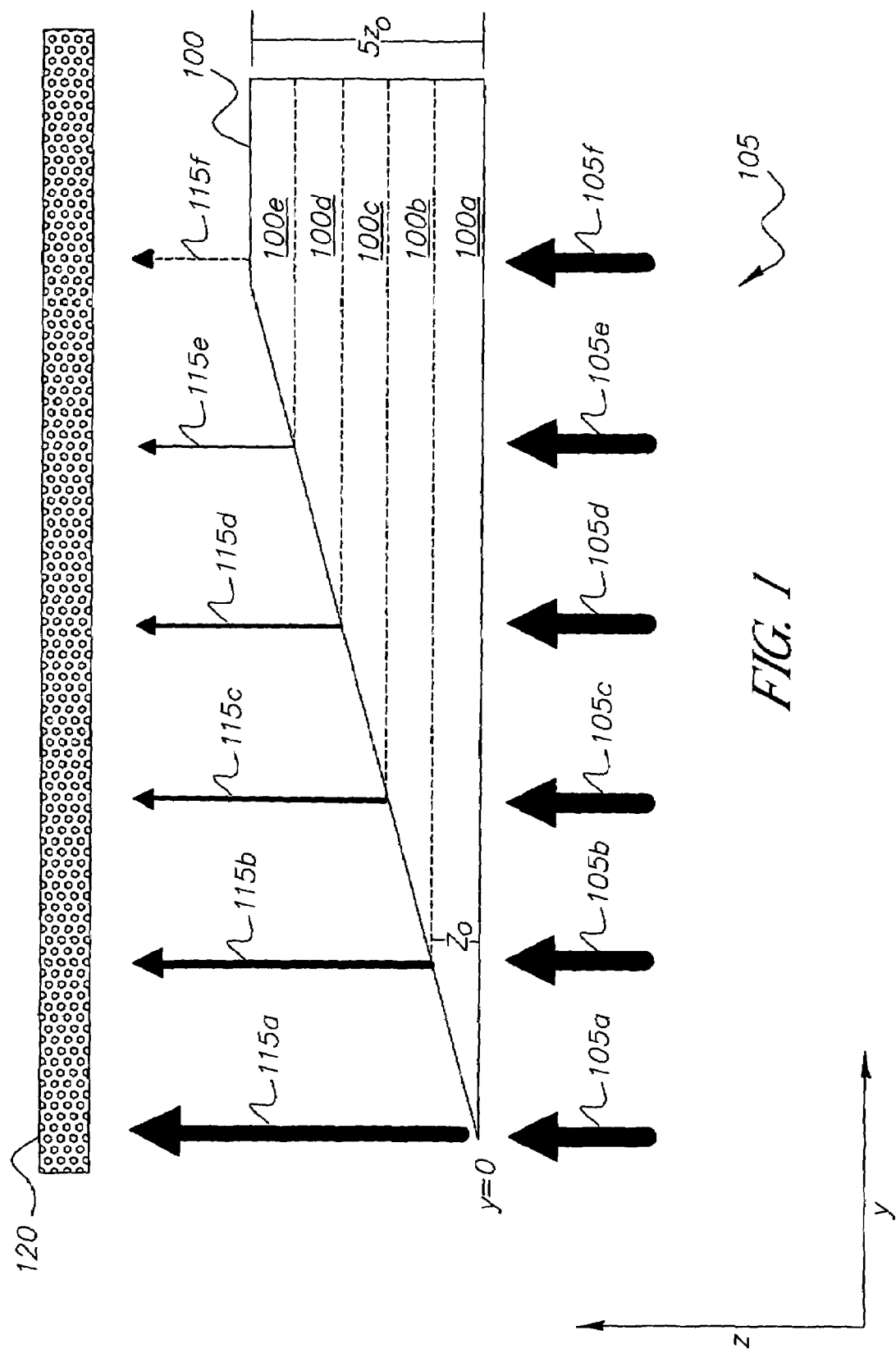
FIG. 1 illustrates the exponential relationship between the thickness of intervening material and the attenuation of penetrating radiation.

The following is a detailed description of the preferred embodiments of the invention, reference being made to the drawings in which the same reference numerals identify the same elements of structure in each of the several figures.

As discussed above, employing a logarithmic amplifier in the imaging process effectively maps the characteristic exponential attenuation to a straight line. Stated differently, the logarithmic amplifier essentially makes it appear that radiation attenuation is a linear function of material thickness across the dynamic range of the imaging system (e.g., from zero attenuation to substantially complete attenuation). Logarithmic amplification establishes substantially the same contrast resolution across the entire dynamic range by making it appear that each additional increment of material causes the same amount of ray attenuation as prior increments of material thickness.

Figure 2:
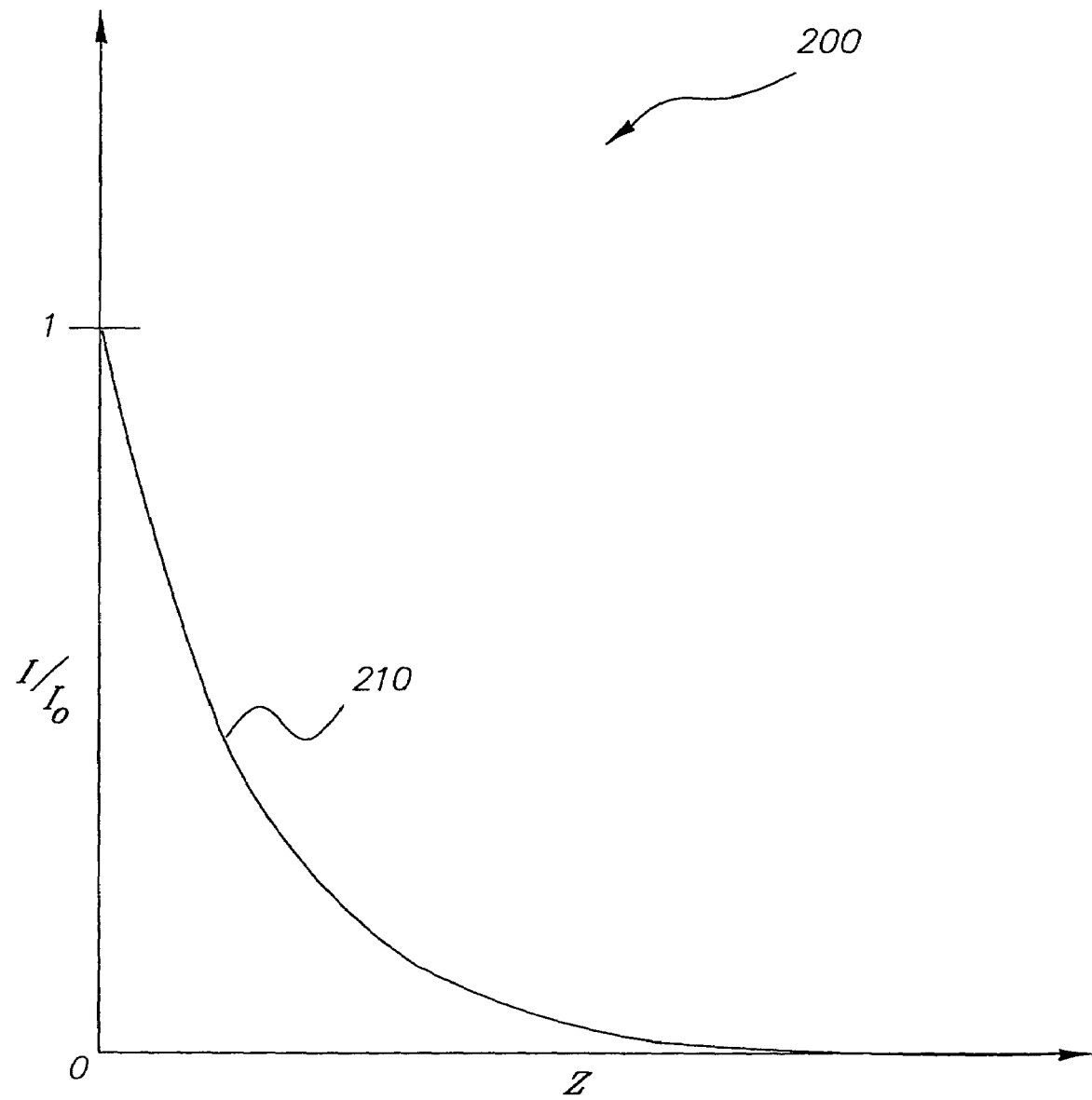
FIG. 2 shows a plot showing the ratio of emitted radiation intensity to penetrating radiation intensity as a function of thickness.

A material's density is often given in units of thickness of a material having well known absorption characteristics, such as aluminum. For example, it is common to characterize absorption characteristics of various materials (e.g., tissues in the human body) by an equivalent thickness of aluminum. This relationship suggests that curve 210 in FIG. 2 may also describe the attenuation characteristics wherein the horizontal axis applies to density as well as thickness.

Accordingly, just as the attenuation change per additional increment of material thickness is significantly greater at small thickness, so is the attenuation change per incremental density significantly greater at lower densities. That is, without amplification, the contrast resolution may be larger for lower densities.

As discussed above, logarithmic amplification modifies detection signals such that the contrast resolution is substantially the same across the dynamic range. To achieve this substantially linear result, contrast resolution for the first part of the range (e.g., portions of the curve 210 at small z) tends to get reduced as a result of the logarithmic amplification while the contrast resolution for later parts of the range (e.g., portions of the curve 210 at large z) tends to be increased. Applicant has recognized that logarithmic amplification will impact different portions of the dynamic range differently, and in some cases, adversely. For example, logarithmic amplification may result in reduced contrast resolution for lower density material.

Various aspects of the invention derive from Applicant's recognition that, while logarithmic amplification may provide a globally appropriate compensation across the entire dynamic range, the contrast resolution of portions of the dynamic range may be improved and/or optimized by employing other varieties of amplification.

Figure 3:
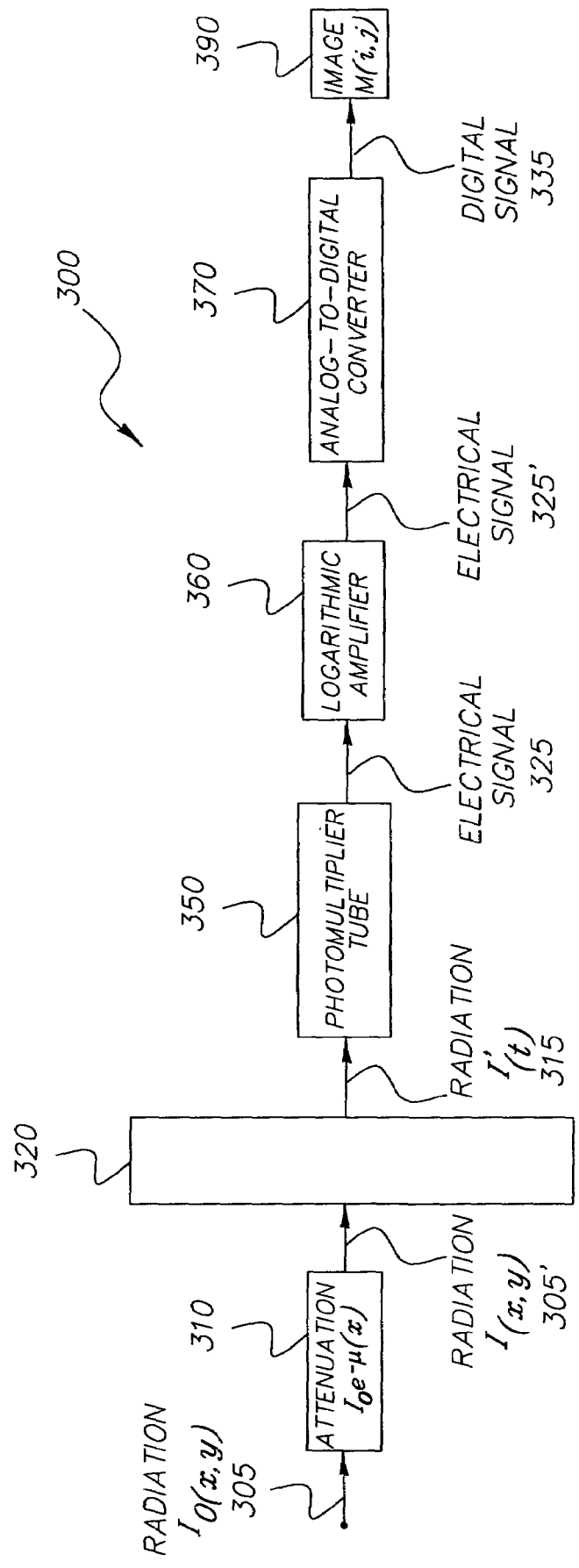
FIG. 3 schematically illustrates a scanning process of a conventional computer radiography imaging process.
Figure 4:
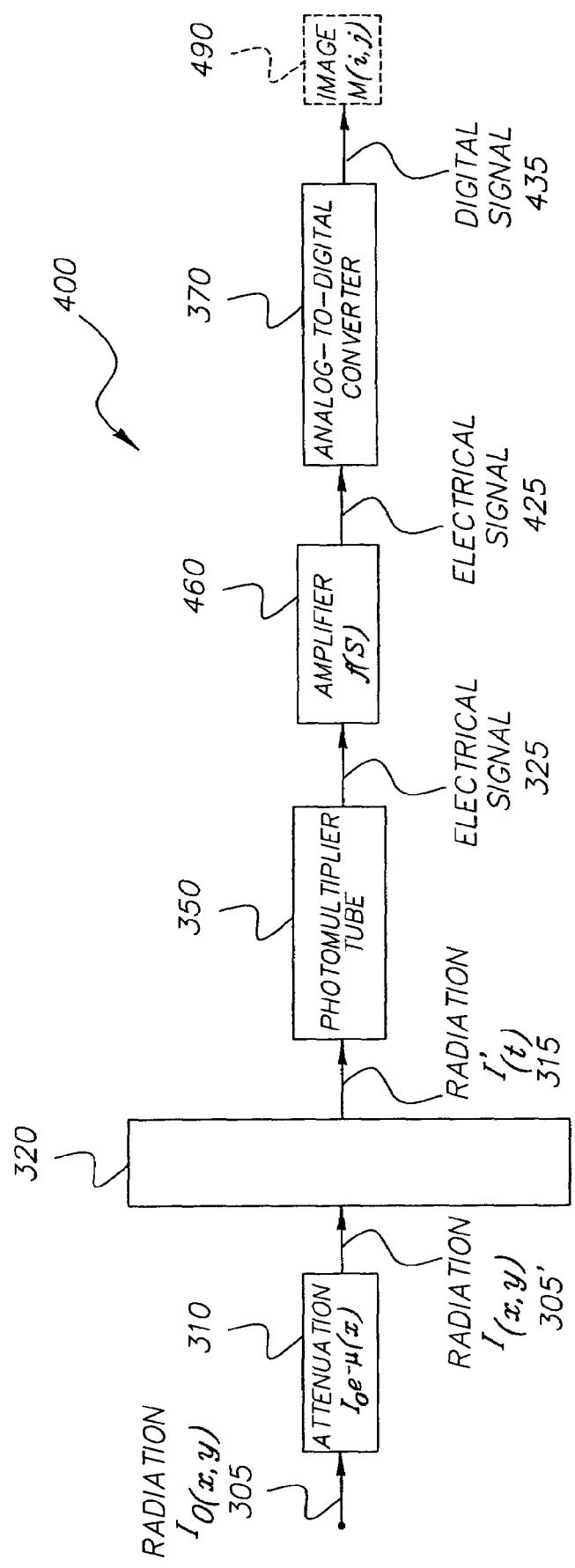
FIG. 4 schematically shows a flow diagram of a process of capturing a CR image in accordance with one embodiment of the present invention.

FIG. 4 illustrates a flow diagram of a process of capturing a CR image in accordance with one embodiment of the present invention. Scanning process 400 is similar to the process illustrated in FIG. 3. However, logarithmic amplifier 360 has been replaced by amplifier 460. Amplifier 460 may amplify signal 325 according to any desired function to generally improve the contrast resolution over a portion of the dynamic range. In general, amplifier 460 is chosen to improve the contrast resolution of some targeted portion of the dynamic range, for example, a desired density range.

It should be appreciated that the aspects of the invention are not limited to CR applications and may be used in connection with, for example, direct radiography (DR) or any imaging technology wherein the object being imaged is exposed to radiation. Since the characteristic exponential attenuation is inherent to radiation penetration, various aspects of the invention may be used to improve images in any X-ray device, including, but not limited to computed tomography (CT), laminographic imaging, CR, DR, and the like. Applicant has contemplated using various aspects of the invention at least with any system wherein the characteristic exponential attenuation occurs and/or is compensated for, and such systems are considered to be within the scope of the invention.

Figure 5:
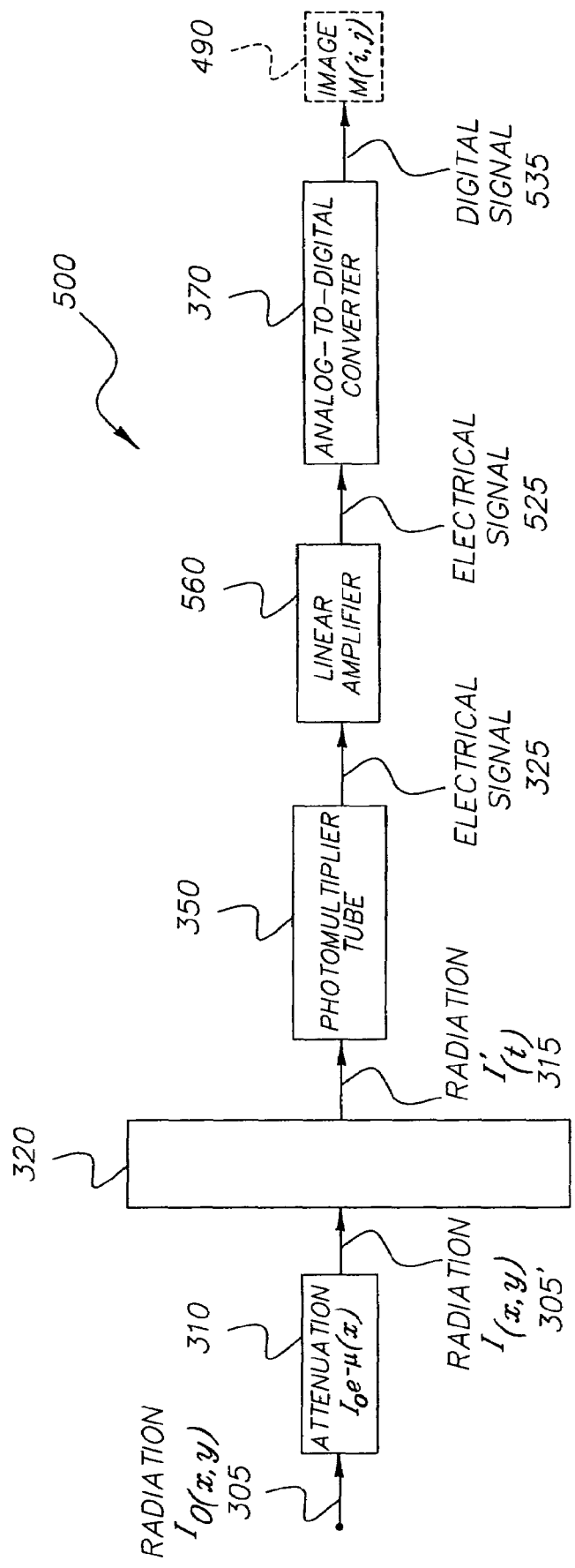
FIG. 5 schematically shows a flow diagram of a process of capturing a CR image in accordance with another embodiment of the present invention.

FIG. 5 illustrates a scanning process in accordance with one embodiment of the present invention in which the detection signal is provided to a linear amplifier. Applicant has appreciated that a linear amplifier may provide a mapping of the lower portion of the dynamic range in such a way as to increase the contrast resolution of lower density material. In particular, scanning process 500 may be substantially the same as scanning process 400 illustrated in FIG. 4. However, electrical signal 325 is provided to linear amplifier 560. Linear amplifier 560 facilitates preserving more contrast resolution in lower portions of the dynamic range.

In some medical diagnostic procedures, certain areas of the body are imaged such that relatively high density material is either known to be absent (or in substantially negligible amounts) or is not of particular interest. Accordingly, it may be desirable to increase the contrast range of the lower density subject matter. For example, in mammography, the tissue being imaged may be substantially homogeneous and of a relatively low density (e.g., as compared to teeth, bone, high density organs, and the like). Cancerous or otherwise suspect nodules may also have a density that is relatively similar to the surrounding breast tissue.

Conventional logarithmic amplification tends to spread the contrast over the entire dynamic range. As a result, there may not be enough contrast in the low density spectrum to resolve normal breast tissue from anomalous tissue, such as a cancerous growth or nodule. Stated differently, density differences between normal and anomalous tissue may not be large enough to result in discernable differences in pixel intensity in the resulting images using conventional logarithmic amplification. Applicant has identified that employing a linear amplifier provides increased contrast resolution in portions of the dynamic range that includes normal breast and anomalous breast tissue that may be the target of a diagnostic procedure.

It should be appreciated that, while a linear amplifier may be appropriate for some contrast resolution enhancement situations, other amplifiers may be used to customize particular imaging procedures. Amplifiers of any type, shape or functions that operate on at least a portion of the dynamic range may be used, as the invention is not limited in this respect. For example, arithmetic, geometric and/or power amplification may be employed to amplify an acquired detection signal. In addition, different amplification techniques may be employed for different portions of the dynamic range to piecewise optimize the contrast resolution over the dynamic range.

Figure 6:
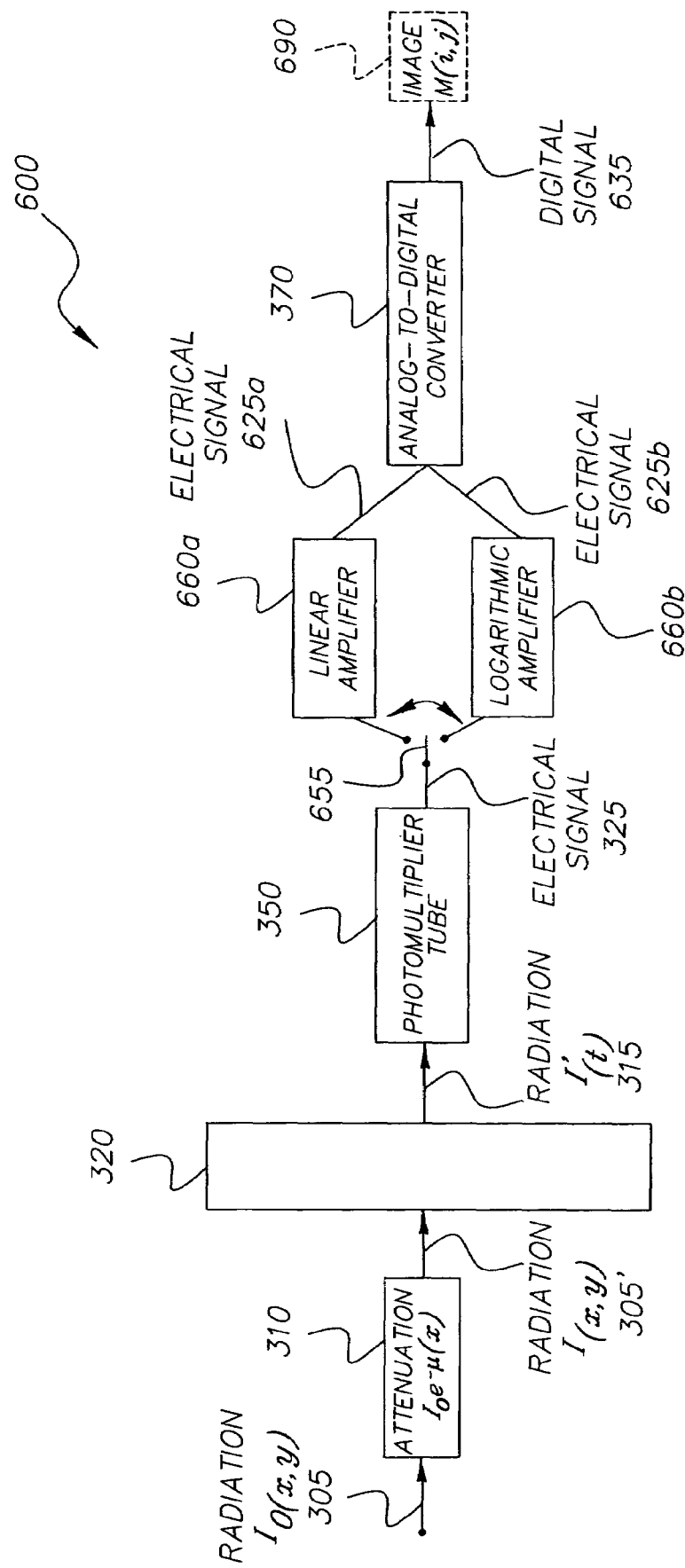
FIG. 6 schematically shows a flow diagram of a process of capturing a CR image in accordance with yet another embodiment of the present invention.

FIG. 6 illustrates an image acquisition process in accordance with one embodiment of the present invention. The imaging process may be similar in most respects to the imaging processes illustrated in FIGS. 4 and 5. However, in the embodiment illustrated in FIG. 6, detection signal 325 may be provided to either linear amplifier 660a or logarithmic amplifier 660b depending on the magnitude of detection signal 325. For example, when detection signal 325 has a magnitude greater than a predetermined threshold value, switch 655 may be set so as to provide detection signal 325 to linear amplifier 660a. When detection signal 325 is less than the threshold value, switch 655 may be set so as to provide detection signal 325 to logarithmic amplifier 660b. In this way, desired portions of the dynamic range may be amplified independently and in different manners.

It should be appreciated that any number of amplifiers of any type may be used to amplify portions of the dynamic range, as the invention is not limited in this respect. For example, two or more linear amplifiers having different slopes may be employed and switched into operation depending on one or more respective desired threshold values to facilitate piecewise amplification of the dynamic range. In addition, rather than switch a detection signal between a plurality of amplifiers, the detection signal may be provided in parallel to each of a plurality of amplifiers.

Figure 7:
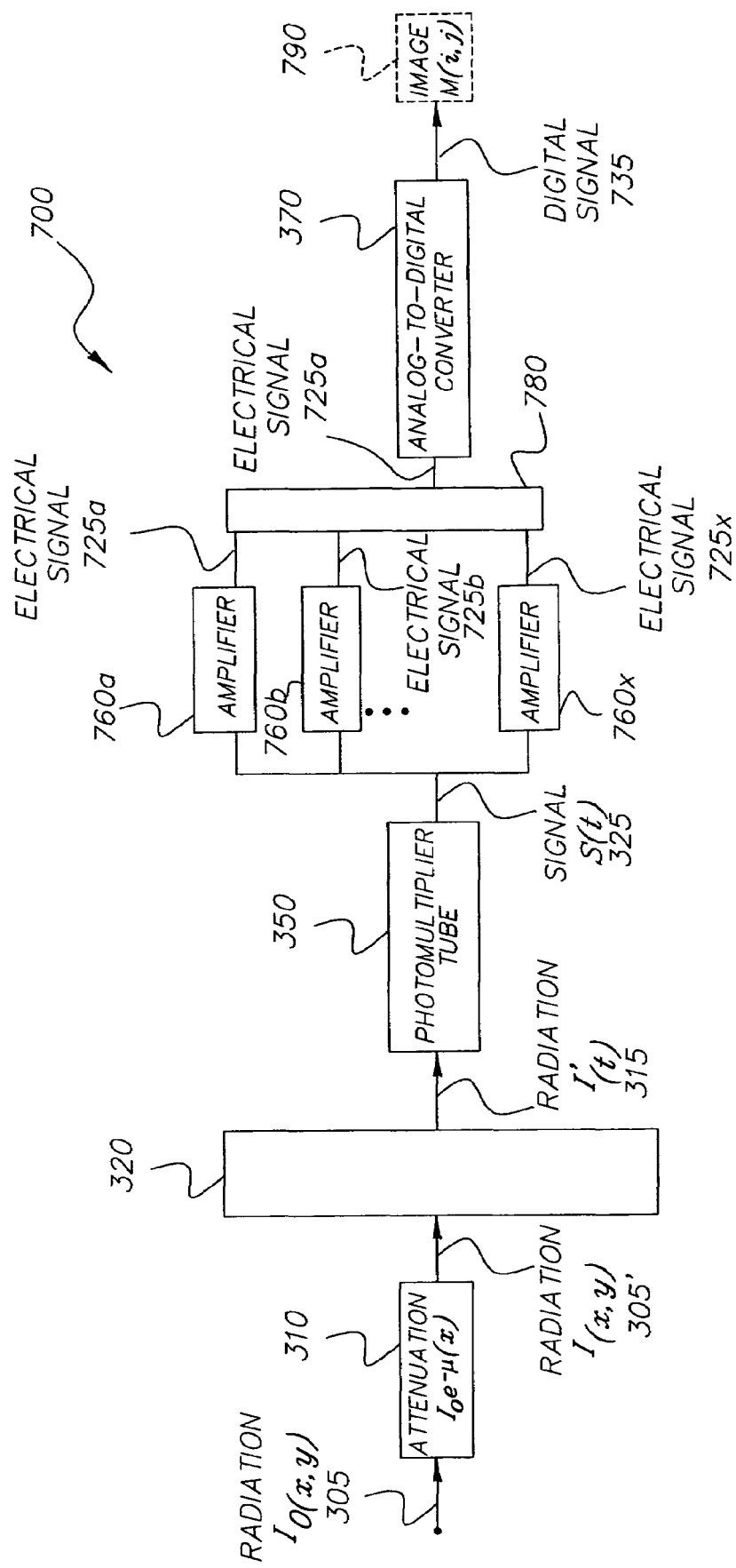
FIG. 7 schematically shows a flow diagram of a process of capturing a CR image in accordance with a further embodiment of the present invention.

For example, in FIG. 7, detection signal 325 may be provided to each of amplifiers 760a, 760b, 760c, etc. Amplifiers 760 may include any number of amplifiers of any type. The outputs of each of the amplifiers may be provided to decision block 780. Decision block 780 may decide which amplified signal to use or may combine the signals in a weighted sum to generate electrical signal 735. It should be appreciated that in some embodiments, each amplifier output may be converted into a digital signal. The various digital signals may then be processed by a processor which may choose between one or more of the digital signals, combine one or more of the digital signals, or otherwise modify the digital signals to produce image 790.

In the embodiments described above, the conversion of the photonic signal from the phosphor plate and the compensating amplifier are illustrated as two separate stages of the image acquisition process. However, in some embodiments, at least some amplification may occur in the photomultiplier. For example, a photomultiplier may include circuitry, such as a voltage divider circuit, that facilitates the generation of the electrical signal responsive to photonic energy impinging on the photomultiplier. This circuitry may include a gain component which can be varied to provide in part a desired compensating amplification.

In conventional CR systems, an amplified detection signal is converted to a digital signal across the dynamic range of the system according to the resolution of the analog to digital converter (ADC). For example, assume ADC 370 in FIG. 3 is an 8-bit converter and detection signal 325' is a voltage waveform. To form image 390, a pixel intensity of zero may be assigned to maximum values of the detection signal (i.e., to values indicating that corresponding radiation impinging on the phosphor plate underwent substantially no attenuation), a pixel intensity of 255 may be assigned to minimum values of the detection signal (i.e., to values indicating that the corresponding radiation was substantially attenuated), and the values 1-254 distributed evenly across values of electrical signal 325'. The ADC therefore is capable of resolving 256 independent density values, spread substantially evenly across the dynamic range. The smallest change in density that the CR system can resolve (indicated by the least significant bit (LSB) of the ADC) is the maximum value of the detection signal $V_{max}$ divided by 256.

Applicant has recognized that the resolution of a CR system may be improved by reducing the range of values over which an ADC digitizes the detection signal. For example, it may be known a priori that an object being scanned includes no subject matter having a density above a certain threshold. Accordingly, it is expected that detection signals resulting from scanning a phosphor plate exposed with the object will not exceed a corresponding voltage value. As a result, the bits of the ADC allocated to portions of the dynamic range that may never arise in a particular application are effectively wasted, impacting the overall resolution capability of the CR system.

For example, assume that a particular diagnostic procedure includes scanning subject matter (e.g., human anatomy) that is known to result in a maximum attenuation, such that corresponding detection signals do not fall below approximately $V_{max}/2$. By changing the range of values digitized by the ADC to match this predetermined minimum value, the LSB may be reduced by half. That is, the CR system may be capable of resolving changes in density twice as small as conventional CR systems that digitize the entire dynamic range. For example, the 255 pixel value may be reassigned to represent any predetermined minimum value of the detection signal (e.g., $V_{max}/2$), rather than the minimum value of the dynamic range. Therefore, the 256 values of the ADC are redistributed over the range $V_{max}/2 - V_{max}$ and the LSB of the ADC has been reduced to $V_{max}/2$. Similarly, the full dynamic range may be truncated by digitizing only values below a desired threshold $V_{thresh}$ or in a range $V_{low} - V_{high}$.

It should be appreciated that any subset of the full dynamic range may be digitized by the ADC, and the range may be tailored according to expected values in a given application to optimize the resolution of the CR system. It should be further appreciated that the assigning of pixel values to levels of an electrical input signal may be done in any manner. For example, inverted from the exemplary values described above.

Figure 8:
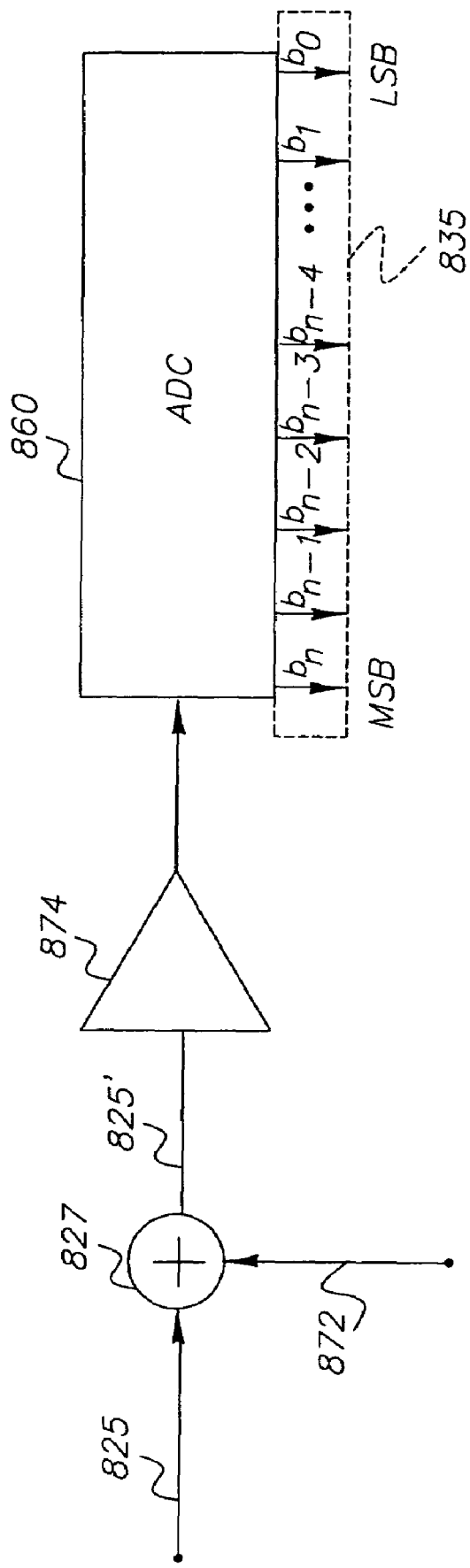
FIG. 8 illustrates an analog-to-digital converter for use in a CR system in accordance with an embodiment of the present invention.

FIG. 8 illustrates an analog-to-digital converter (ADC) for use in a CR system in accordance with one embodiment of the present invention. ADC 860 is an n-bit (e.g., bits $b_n$-$b_0$) converter coupled to an input detection signal 825. The input detection signal 825 may be, for example, a voltage signal or a current signal indicative of the intensity of stimulated radiation emitted from an exposed phosphor plate (e.g., the output of a photomultiplier). Typically, detection signal 825 will have been applied to a compensating amplifier, for example, any of the various amplifiers described herein. Detection signal 825 may have a maximum value indicating zero ray attenuation and a minimum value indicating substantially full ray attenuation (or vice-versa). The difference between the maximum and minimum values (i.e., $V_{max}$-$V_{min}$) defines the dynamic range of detection signal 825. It should be appreciated that the signal extremes may be switched, i.e., the maximum value may indicate full ray attenuation and the minimum value may indicate zero ray attenuation.

If the entire dynamic range is digitized, the CR system including ADC 860 would be capable of resolving density differences of $V_{max}/2^n$. That is, the digital signal 835 may take on $2^n$ values, where the LSB (e.g., bit $b_0$) has a density weight of $V_{max}/2^n$. However, this resolution may be improved by truncating the range over which detection signal 825 is digitized. ADC 860 includes an offset or pedestal 872 that can be added to detection signal 825 by summing element 827 to provide offset detection signal 825'. The pedestal value may be a positive or negative number adapted to shift values of electrical signal 825 to allow for digitization of a truncated range. In addition, ADC 860 includes variable gain 874 adapted to multiply offset detection signal 825' by one of a range of possible values. Pedestal 872 and variable gain 874 facilitate tailoring the effective range over which the ADC digitizes, as described in further detail below.

The purpose of the pedestal 872 and variable gain 874 is to fit a truncated range of values of detection signal 825' to the range of values expected by ADC 860. For example, ADC 860 may be configured to digitize a predetermined range of values, such as 0-$V_{max}$. Because of known attributes of a particular diagnostic procedure, it may be desirable to digitize a truncated range $V_{max}/2$-$V_{max}$ to improve the resolution of the ADC. To fit the truncated range to the expected range, the values of detection signal 825' must be modified accordingly. In particular, the value of $V_{max}/2$ (i.e., the minimum value of the truncated range) must be subtracted from detection signal 825' so that the minimum value of the truncated range becomes the minimum value of the expected range (i.e., an expected value of zero). To expand the offset detection signal 825' to the expected range of the ADC, values of the offset detection signal 825' must be multiplied by a gain coefficient that depends on the relative size of the truncated range to the expected range. In this example, the truncated range is half the size of the expected range. Therefore, the gain coefficient of variable gain 874 should be set to a gain of 2, such that the maximum value of the offset detection signal 825' after subtracting the pedestal (i.e., $V_{max}/2$) is expanded to the maximum value of the expected range (i.e., $V_{max}$). It should be appreciated that by setting the values of pedestal 872 and the gain coefficient of variable gain 874 appropriately, any desired truncated range may be expanded to fit the expected range of the ADC.

In one embodiment, a CR system includes one or more amplifiers, for example, a linear amplifier to increase the contrast resolution of at least a portion of the dynamic range. Any of the above configurations of compensating amplifiers described in the embodiments above may be used. In addition, the output from the one or more compensating amplifiers is truncated to improve the resolution of the ADC over a subset of values of the dynamic range. For example, the output from the one or more compensating amplifiers may be provided to a pedestal and variable gain combination as described above, the values of which may be set to choose any desired truncated range of the actual range of the detection signal provided by the one or more compensating amplifiers. By combining the effects of targeted compensating amplifiers and increased resolution of truncated ranges, the resolution of images for diagnostic procedures for which they were tailored can be greatly improved, increasing the efficacy of the diagnostic.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, any one or more compensating amplifiers to improve the contrast resolution of a portion of the dynamic range may be used alone or in combination with apparatus for truncating the range of values digitized by the ADC.

In addition, any of the various compensating amplifiers, optimized ADC ranges, or combinations thereof may be used with any imaging system that employs electromagnetic radiation exposure to obtain information about an object being imaged. For example, compensating amplifiers as described above to compensate for detector signals in a detector array in a CT scanning device. Likewise, detection signals in a DR device may be compensated by providing them to a desired amplifier that improves the resolution of some portion of the dynamic range. Accordingly, the foregoing description and drawings are by way of example only.

The phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A radiation image read-out method for a stimulable phosphor sheet, provided with a layer of stimulable phosphor, which has been exposed to radiation to carry information about an image, and the image is thereby stored on the stimulable phosphor sheet, the method comprising the steps of:
   exposing the stimulable phosphor sheet to stimulating rays to emit light in proportion to the amount of energy stored thereon during its exposure to radiation;
   sensing the emitted light to generate a detection signal;
   amplifying the detection signal using a first amplifier or a second amplifier, dependent on the magnitude of the detection signal, to generate an amplified detection signal, the first amplifier differing from the second amplifier; and
   converting the amplified detection signals into a digital signal to form a digital image.

2. The method according to claim 1, wherein the step of amplifying is accomplished by amplifying the detection signal using a logarithmic amplifier or a non-logarithmic amplifier, dependent on the magnitude of the detection signal, to generate an amplified detection signal.

3. The method according to claim 2, wherein the non-logarithmic amplifier is a linear amplifier.

4. The method according to claim 2, wherein the non-logarithmic amplifier is a arithmetic, geometric, or power amplifier.

5. The method according to claim 1, wherein the step of amplifying the detection signal is accomplished by the steps of:
   amplifying the detection signal using a logarithmic amplifier if the magnitude of the detection signal is less than a predetermined threshold value; and
   amplifying the detection signal using a non-logarithmic amplifier if the magnitude of the detection signal is greater than the predetermined threshold value.

6. The method according to claim 1, wherein the step of converting the amplified detection signals into a digital signal to form a digital image is accomplished by the step of:
   determining which amplified detection signals to convert into digital signals such that not all the amplified detection signals are converted.

7. The method according to claim 6, further comprising the step of applying a weighting factor to the amplified detection signals to be converted into digital signals.

8. A radiation read-out apparatus for a stimulable phosphor sheet, provided with a layer of stimulable phosphor, which has been exposed to radiation to carry information about an image, and the image is thereby stored on the stimulable phosphor sheet, comprising:
   means for exposing the stimulable phosphor sheet to stimulating rays to emit light in proportion to the amount of energy stored thereon during its exposure to radiation;
   means for sensing the emitted light to generate a detection signal;
   means for amplifying the detection signal using a first amplifier or a second amplifier, dependent on the magnitude of the detection signal, to generate an amplified detection signal, the first amplifier differing from the second amplifier; and
   means for converting the amplified detection signals into a digital signal to form a digital image.

9. The apparatus according to claim 8, wherein the first and second amplifiers are a logarithmic amplifier and a non-logarithmic amplifier.

10. The apparatus according to claim 9, wherein the non-logarithmic amplifier is a linear amplifier.

11. The apparatus according to claim 10, wherein the non-logarithmic amplifier is a arithmetic, geometric, or power amplifier.

12. The apparatus according to claim 9, further comprising means for determining a predetermined threshold value such that the detection signal is (1) amplified using a logarithmic amplifier if the magnitude of the detection signal is less than a predetermined threshold value and (2) amplified using a non-logarithmic amplifier if the magnitude of the detection signal is greater than the predetermined threshold value.

13. A radiation image read-out method for a stimulable phosphor sheet, provided with a layer of stimulable phosphor, which has been exposed to radiation to carry information about an image, and the image is thereby stored on the stimulable phosphor sheet, the method comprising the steps of:
   exposing the stimulable phosphor sheet to stimulating rays to emit light in proportion to the amount of energy stored thereon during its exposure to radiation;
   sensing the emitted light to generate a detection signal;
   amplifying the detection signal using a logarithmic amplifier if the magnitude of the detection signal is less than a predetermined detection signal threshold value;
   amplifying the detection signal using a linear amplifier if the magnitude of the detection signal is greater than the predetermined detection signal threshold value;
   determining whether the amplified detection signal should be converted into a digital signal such that not all the amplified detection signals are converted; and
   converting the determined amplified detection signals into digital signals to form a digital image.

14. The method according to claim 13, further comprising the step of applying a weighting factor to the amplified detection signals to be converted into digital signals.

* * * * *